A. REMAR.
TIRE ARMOR AND ANTISKID DEVICE.
APPLICATION FILED FEB. 24, 1921.

Patented July 26, 1921.

Inventor
A. Remar
By F. K. Bryant,
Attorney

A. REMAR.
TIRE ARMOR AND ANTISKID DEVICE.
APPLICATION FILED FEB. 24, 1921.

1,385,753.

Patented July 26, 1921.
2 SHEETS—SHEET 2.

Inventor
A. Remar

By J. K. Bryant,
Attorney

UNITED STATES PATENT OFFICE.

ALBERT REMAR, OF MAYNARD, OHIO.

TIRE ARMOR AND ANTISKID DEVICE.

1,385,753.   Specification of Letters Patent.   Patented July 26, 1921.

Application filed February 24, 1921. Serial No. 447,433.

*To all whom it may concern:*

Be it known that I, ALBERT REMAR, a citizen of the United States of America, residing at Maynard, in the county of Belmont and State of Ohio, have invented certain new and useful Improvements in Tire Armor and Antiskid Devices, of which the following is a specification.

This invention relates to certain new and useful improvements in tire armors and anti-skid devices wherein a plurality of connected metallic plates are assembled in inclosing relation on the tread surface of a tire with anti-skid ribs formed integral with the outer face of the plates with means for anchoring the assembled plates to the rim flanges of the wheel.

With the above general objects in view and others that will become apparent as the nature of the invention is better understood the same consists in the novel form, combination and arrangement of parts hereinafter more fully described, shown in the accompanying drawings and claimed.

Figure 1:
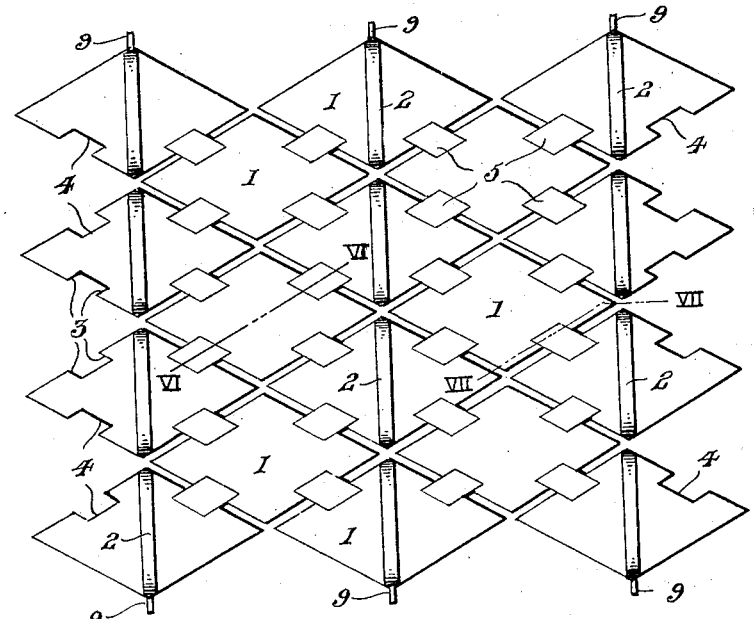
Figure 2:
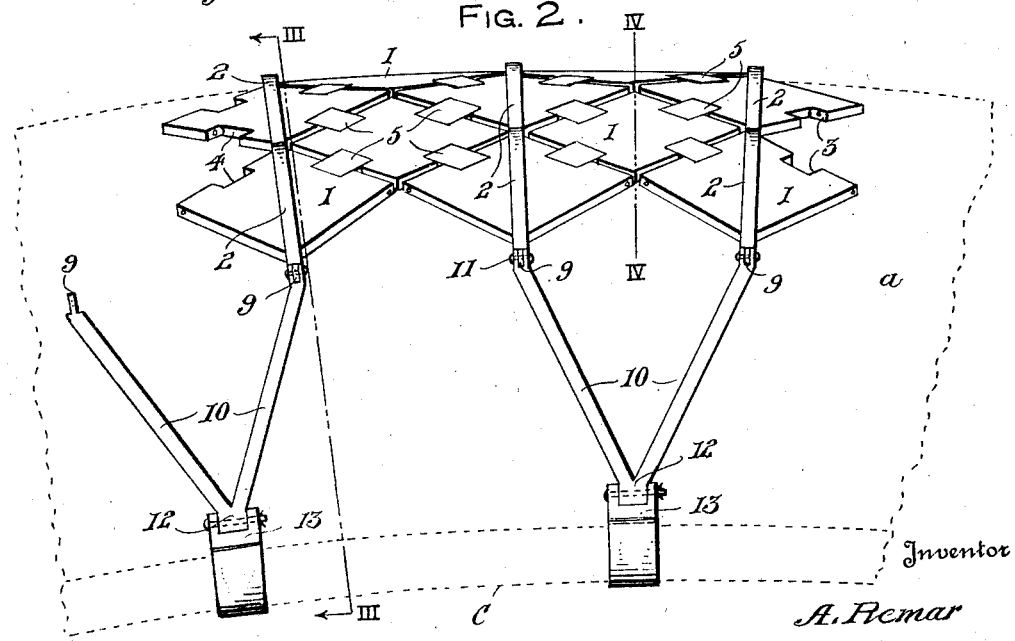
Figure 3:
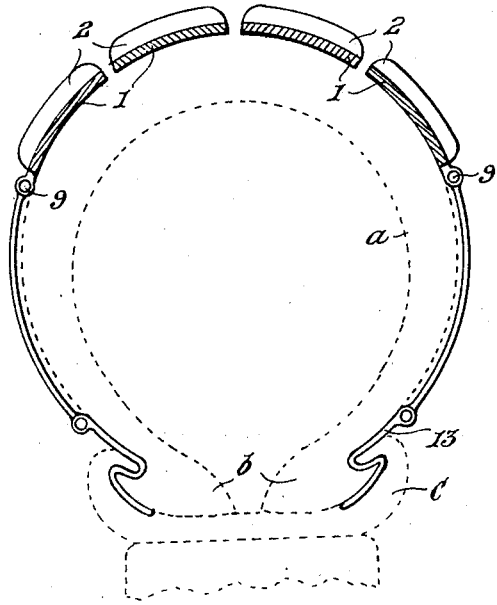
Figure 4:
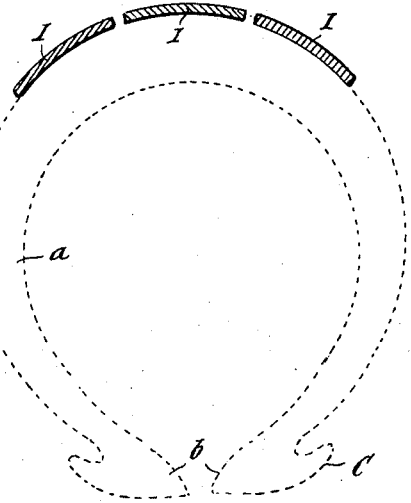
Figure 5:
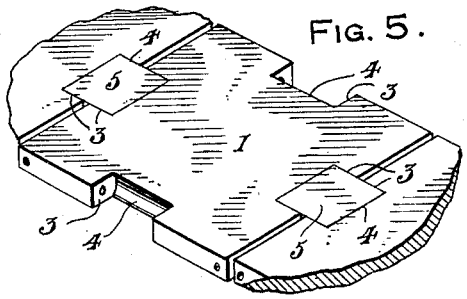
Figure 8:
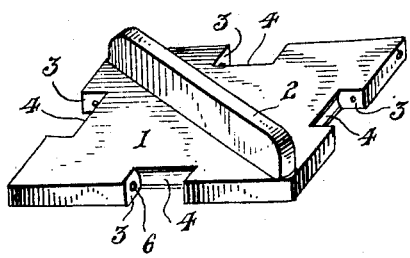
Figure 6:
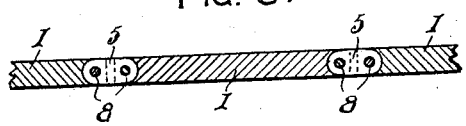
Figure 7:
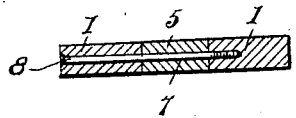

In the drawings, wherein like reference characters indicate corresponding parts throughout the several views, Figure 1 is a top plan view of a portion of the tire armor and anti-skid device showing the connected plates provided with anti-skidding ribs, Fig. 2 shows by dotted lines a fragmentary side elevational view of a tire with the present invention in operative position thereon, Fig. 3 is a cross sectional view taken on line III—III of Fig. 2 showing the armor anchoring hooks and the transverse anti-skid ribs, Fig. 4 is a cross sectional view taken on line IV—IV of Fig. 2 showing the tread plates engaging the tread portion of the tire, Fig. 5 is a detail perspective view of a portion of the armor, Fig. 6 is a cross sectional view taken on line VI—VI of Fig. 1, showing the hinge connections between the armor plates, Fig. 7 is a cross sectional view taken on line VII—VII of Fig. 1 showing the screw pins for connecting the armor plates, and Fig. 8 is a perspective view of one of the armor plates showing the tread rib and the side sockets for the hinge blocks.

Referring more in detail to the accompanying drawings there is illustrated a tire armor and antiskid device formed of a plurality of rhombus-shaped metallic plates 1 transversely curved coincident to the curvature of the tread portion of the tire *a* as shown in Figs. 3 and 4 with the longitudinal axes of the plates 1 when assembled, extending circumferentially of the tire *a* as shown in Figs. 1 and 2. Each plate is provided with a transversely extending anti-skid rib 2 forming an integral part thereof, ribs 2 extending between the obtuse angled corners of the plates as shown in Figs. 1, 2 and 8.

The plates 1 forming the armor are hingedly connected at their adjacent edges, the edges of the plates 1 being cut away intermediate the ends thereof as at 3 with curved bottom walls 4 as clearly shown in Figs. 6 and 8. Hinged blocks 5, of the form best illustrated in Figs. 5 and 6 having curved side walls are received in the cut out portions 3 with the opposite edges thereof engaging the curved bottom walls 4 of the adjacent plates 1, the edges of the plates 1 being provided with longitudinal openings 6 that register with openings 7 in the blocks 5 as shown in Fig. 7 into which screw pins 8 are received for retaining the plates 1 in assembled relation as shown in Figs. 1 and 2.

To retain the armor on the tread of the tire *a* the outer corner edges of the laterally positioned plates 1 are provided with lugs 9 that are secured to the adjacent ends of V-shaped brackets 10 by studs 11, the brackets being curved as shown in Figs. 2 and 3, coincident to the curvature of the side wall of the tire *a* with the inner ends 12 of the brackets pivotally supported in hooks 13. The hooks 13 are reversely curved as shown in Figs. 2 and 3 for engaging within the rim flanges *c* and the tire beads *b*, the hooks 13 securely anchoring the tire armor on the tire *a*.

The hinged blocks 5 connecting the plates 1 have the opposite faces thereof lying substantially flush with the opposite face of the plates so that injury to the tire will be entirely eliminated while the anti-skidding ribs 2 are alone presented for earth gripping to prevent skidding of the wheel. The connection between the plates 1 will permit free flexible movement thereof to compensate for varying pressures on the tire *a* with the result that the armor will snugly engage the outer surface of the tire at all times irrespective of different loads placed thereon.

While there is herein shown and described the preferred embodiment of the present invention, it is nevertheless to be understood that minor changes may be made therein without departing from the spirit and scope of the invention as claimed.

What is claimed as new is:—

1. A tire armor and anti-skid device comprising a plurality of rhombus-shaped plates transversely curved coincident to the curvature of a tire, with the longitudinal axes of the plates extending circumferentially of the tire ribs extending between the obtuse angles of said plates, hinge connections between adjacent edges of the plates, means for anchoring the plates to a tire, said means including a plurality of V-shaped brackets having the spaced ends thereof connected to the adjacent edges of the laterally positioned plates, and reversely curved hooks carried by the inner ends of said brackets engaging the wheel rim to hold the tire armor in position.

2. A tire armor and anti-skid device comprising a plurality of rhombus-shaped plates transversely curved coincident to the curvature of a tire, with the longitudinal axes of the plates extending circumferentially of the tire ribs extending between the obtuse angles of said plates, hinge connections between adjacent edges of the plates, means for anchoring the plates to a tire, said hinge connections including the formation of side notches in the plates intermediate the ends thereof, hinge blocks extending into adjacent notches, screw pins passing through said plates and blocks to hold the plates assembled, said means including a plurality of V-shaped brackets having the spaced ends thereof connected to the adjacent edges of the laterally positioned plates and reversely curved hooks carried by the inner ends of said brackets engaging the wheel rim to hold the tire armor in position.

In testimony whereof I affix my signature in presence of two witnesses.

ALBERT REMAR.

Witnesses:
B. H. MURPHY,
AGNES SOKOLL.